May 29, 1951 R. E. YOUNG 2,555,217
FOLDABLE SAW TABLE EXTENSION
Filed June 16, 1948
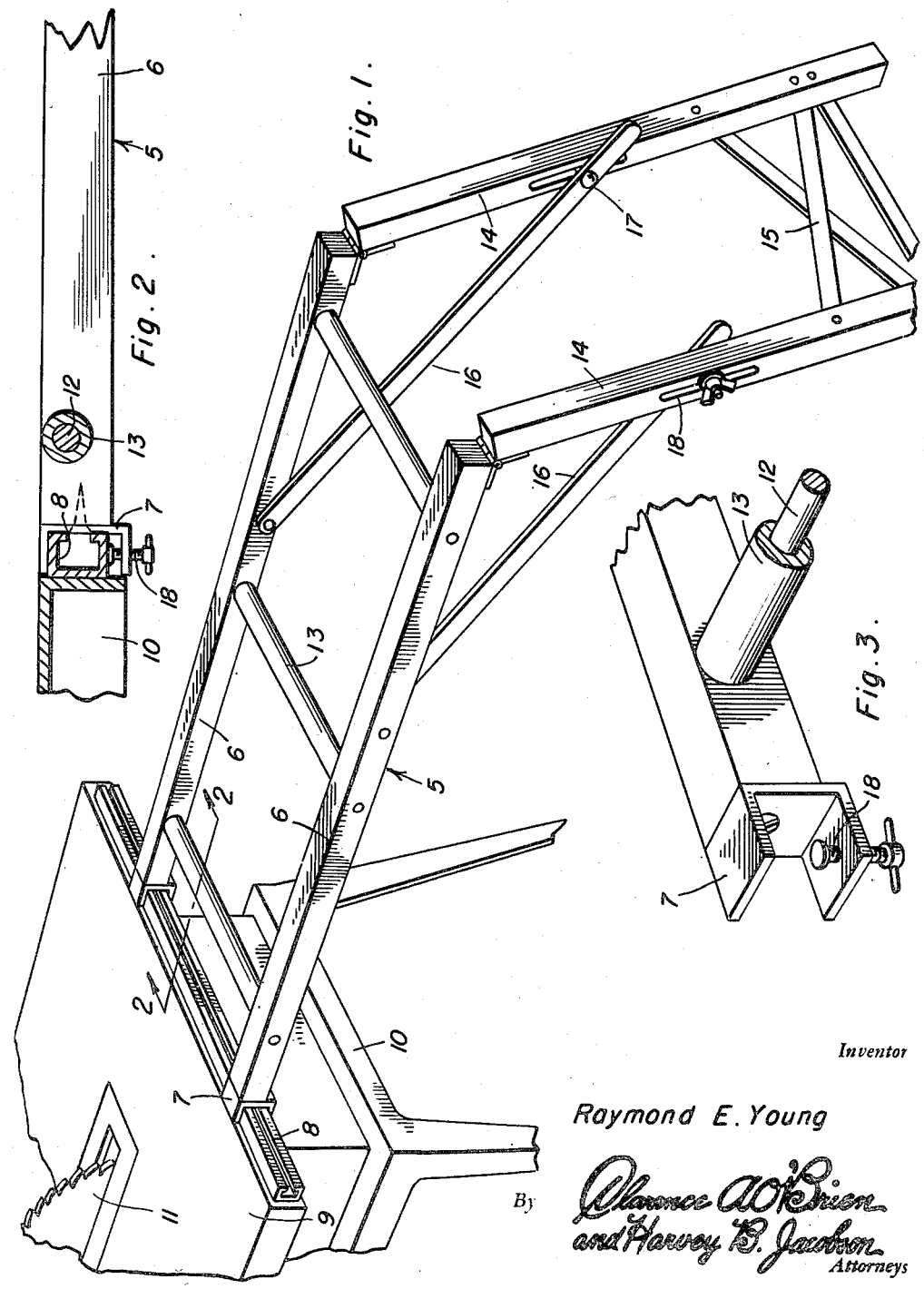
Inventor
Raymond E. Young Patented May 29, 1951

2,555,217

UNITED STATES PATENT OFFICE 2,555,217

FOLDABLE SAW TABLE EXTENSION

Raymond E. Young, Denver, Colo.

Application June 16, 1948, Serial No. 33,295

1 Claim. (Cl. 143—132)

The present invention relates to new and useful improvements in attachments for saw tables and more particularly to the provision of a foldable extension for the table by means of which relatively large pieces of lumber may be supported while being fed to the saw.

An important object of the invention is to provide a foldable saw table extension which may be easily and quickly attached in position to the end or one edge of the saw table without necessitating any changes or alterations in the construction thereof.

A still further object is to provide a foldable saw table extension which may be folded into a compact form and for conveniently handling and storing the same when not in use.

A still further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view showing the saw table extension in position attached to a saw machine;

Figure 2 is an enlarged fragmentary sectional view taken substantially on a line 2—2 of Figure 1, and;

Figure 3 is an enlarged fragmentary perspective view of the inner end of one of the rails of the foldable extension.

Referring now to the drawing in detail wherein for the purpose of illustration I have disclosed a preferred embodiment of the invention the numeral 5 designates the foldable saw table extension generally and which is constructed of a pair of side rails 6 each having a U-shaped clamping bracket 7 of right angled form secured flat to one end thereof flush with the tops of the same for receiving a channel rail 8 which is suitably secured to one edge of a saw table 9. The saw table 9 is supported on a stand 10 and is provided with a rotary saw 11.

The saw rails 6 are secured to each other in spaced parallel relation by means of cross bars 12 on which rollers 13 are journaled substantially flush with the upper surface of the rails.

A pair of legs 14 are hingedly connected at their upper end to the other ends of the rails 6, the legs being rigidly connected to each other by braces 15 and are foldable vertically into and out of position under the rails 6, when not in use.

A pair of inclined braces 16 are pivoted at one end to the respective rails 6 and are provided with bolts and wing nuts 17 adjacent their other end adjustably secured in vertical slots 18 in the legs 14.

In the operation of the device the clamps 7 are secured in a desired position to the rail 8 at the side edge or end of saw table 9 and the leg 14 adjusted to support the rails 6 in a horizontal position coplanar with the table 9. Long pieces of lumber may then be placed on the rollers 13 to support the same while feeding the lumber to the saw 11.

When the saw table extension 5 is not in use the clamps 7 are detached from the rail 8 by releasing clamping screws 18 and the bolt and wing nuts 17 removed from slots 18 of the legs 14 whereupon the legs may be folded upwardly against the rails 6 and the device stored in a substantially compact form.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A saw table extension comprising a rail rectangular in cross section and attachable horizontally to one end of the saw table, a pair of side members connected together, and U-shaped right-angled clamping brackets on corresponding ends of said members slidably straddling said rail for adjustment along the same, said brackets fitting flat against said ends of said members and flush with the tops of said members, and supporting means for the other ends of said members.

RAYMOND E. YOUNG.

REFERENCES CITED

The following references are of record in the file of this patent:

UNITED STATES PATENTS

| Number | Name | Date |
|---|---|---|
| 71,126 | Bragdon | Nov. 19, 1867 |
| 1,511,141 | Scott et al. | Oct. 7, 1924 |
| 1,658,826 | Yerk et al. | Feb. 14, 1928 |
| 1,767,012 | Pfan | June 24, 1930 |
| 1,792,955 | Willis | Feb. 17, 1931 |
| 2,313,617 | Bray | Mar. 9, 1943 |

FOREIGN PATENTS

| Number | Country | Date |
|---|---|---|
| 405 | Great Britain | Jan. 10, 1888 |